(12) United States Patent
Nishikawa

(10) Patent No.: US 9,097,227 B2
(45) Date of Patent: Aug. 4, 2015

(54) FUEL SUPPLY CONTROL DEVICE FOR DIESEL ENGINE

(75) Inventor: Osamu Nishikawa, Ishikawa (JP)

(73) Assignee: KANAZAWA ENGINEERING SYSTEMS INC., Ishikawa (JP)

( * ) Notice: Subject to any disclaimer, the term of this patent is extended or adjusted under 35 U.S.C. 154(b) by 0 days.

(21) Appl. No.: 14/373,463

(22) PCT Filed: Jan. 31, 2012

(86) PCT No.: PCT/JP2012/052087
§ 371 (c)(1),
(2), (4) Date: Jul. 21, 2014

(87) PCT Pub. No.: WO2013/114554
PCT Pub. Date: Aug. 8, 2013

(65) Prior Publication Data
US 2015/0034058 A1    Feb. 5, 2015

(51) Int. Cl.
*F02M 37/00* (2006.01)
*F02D 19/00* (2006.01)
*F02M 67/14* (2006.01)
(Continued)

(52) U.S. Cl.
CPC ........... *F02M 67/14* (2013.01); *F02D 19/0652* (2013.01); *F02D 19/081* (2013.01); *F02M 37/00* (2013.01); *F02M 43/00* (2013.01)

(58) Field of Classification Search
CPC ....... F02M 67/14; F02M 43/00; F02M 63/00; F02M 37/00; F02D 19/00; F02D 19/06; F02D 19/0613; F02D 19/0626; F02D 19/0639; F02D 19/0649; F02D 19/0652; F02D 19/08; F02D 19/081; F02D 41/00

USPC .......... 123/575, 577, 1 A; 701/101, 102, 103, 701/104, 110
See application file for complete search history.

(56) References Cited

U.S. PATENT DOCUMENTS 2,461,580 A * 2/1949 Wiczer et al. ................ 123/25 A
5,336,396 A * 8/1994 Shetley ........................... 210/90
(Continued)

FOREIGN PATENT DOCUMENTS

JP     3816890 B    8/2006
JP     4007437 B2   11/2007
(Continued)

OTHER PUBLICATIONS

English Translation of JP 2008-51112 published Mar. 6, 2008.
(Continued)

*Primary Examiner* — Lindsay Low
*Assistant Examiner* — Grant Moubry
(74) *Attorney, Agent, or Firm* — Gianni Minutoli; DLA Piper LLP (US)

(57) ABSTRACT

A diesel engine fuel supply control device which supplies mixed oil containing petroleum-based fuel oil and unpurified waste oil to a diesel engine as fuel is configured to regulate the amount of waste oil supplied from a first fuel tank to fuel mixing means and the amount of petroleum-based fuel oil supplied from a second fuel tank to the fuel mixing means by controlling waste oil quantity regulating means and petroleum-based fuel oil quantity regulating means on the basis of a mixing ratio set by mixing ratio setting means of an ECU. This makes it possible to stably operate the diesel engine for an extended period of time and greatly increase the ratio of use of waste oil.

11 Claims, 3 Drawing Sheets

(51) Int. Cl.
  *F02D 19/08* (2006.01)
  *F02D 19/06* (2006.01)
  *F02M 43/00* (2006.01)

(56) References Cited

U.S. PATENT DOCUMENTS 5,507,307 A * 4/1996 Montegari et al. ............... 137/9
8,301,359 B1 * 10/2012 Sagar et al. ..................... 701/109
8,485,165 B2 * 7/2013 Payne et al. ..................... 123/575

FOREIGN PATENT DOCUMENTS

| JP | 2008-51112 | 3/2008 |
| JP | 2008-232030 | 10/2008 |
| JP | 2010-53768 | 3/2010 |
| JP | 2010-138769 | 6/2010 |
| JP | 2012-36866 | 2/2012 |

OTHER PUBLICATIONS

English Translation of JP 2010-53768 published Mar. 11, 2010.
English Translation of JP 2010-138769 published Jun. 24, 2010.
English Translation of JP 3816890 B published Aug. 30, 2006.
English Translation of JP 2008-232030 published Oct. 2, 2008.
English Translation of JP 4007437 B2 published Nov. 4, 2014.
English Translation of JP 2012-36866 published Feb. 23, 2013.
International Search Report from PCTJP2012/052087 issued Apr. 24, 2012.

* cited by examiner

FUEL SUPPLY CONTROL DEVICE FOR DIESEL ENGINE

CROSS REFERENCE TO RELATED APPLICATIONS

This application is a U.S. National Stage Application of International Application No. PCT/JP2012/052087 filed Jan. 31, 2012. The entirety of all the above-listed application is incorporated herein by reference

TECHNICAL FIELD

The present invention relates to a fuel supply control device for a diesel engine that delivers mixed oil produced by mixing petroleum-based fuel oil like light oil or heavy oil and unpurified waste animal/vegetable oil or mineral oil which are normally disposed of to the diesel engine as fuel. More particularly, the invention pertains to a fuel supply control device for a diesel engine that can regulate a ratio of mixing waste oil and petroleum-based fuel oil in accordance with an amount of fluctuation in diesel engine speed.

BACKGROUND ART

There is a continuing trend in recent years to undertake research and development efforts for recycling waste cooking oil like edible oil and fat as well as mineral oil like engine oil, which have been disposed of as waste products by food industries and homes, as raw materials of diesel engine fuel from a viewpoint of conservation of resources and environmental conservation.

For example, methods for using waste cooking oil as a raw material of diesel engine fuel thus far proposed include techniques for methyl-esterifying the waste cooking oil through a reaction with methanol, mixing resultant fatty acid methyl ester with light oil at a specific ratio and then using oil thus produced as fuel oil for diesel engines, or as bio-diesel fuel (refer to Patent Documents 1 and 2).

The bio-diesel fuel thus obtained produces smaller amounts of toxic exhaust gases like black smoke and attracts attention as fuel that poses a lesser environmental burden.

Another method proposed, on the other hand, is to simply mix waste cooking oil or mineral oil with petroleum-based fuel oil and use resultant mixed oil as diesel engine fuel.

CITATION LIST

Patent Document

Patent Document 1: Japanese Laid-open Patent Application No. H07-197047
Patent Document 2: Japanese Laid-open Patent Application No. H10-245586

SUMMARY OF INVENTION

Technical Problem

The method of Patent Document 1 or 2, however, which is intended to esterify waste cooking oil to improve quality thereof in order to attain fuel quality comparable to that of light oil, requires a facility for esterifying the waste cooking oil. Therefore, this approach necessitates an increased cost for esterification. Consequently, a current situation is that the amount of waste cooking oil used as diesel engine fuel takes up only a few percent of the total amount of waste cooking oil that is disposed of.

The method that involves simply mixing waste cooking oil with petroleum-based fuel oil and using the resultant mixed oil as diesel engine fuel also has a drawback mentioned below. Specifically, if waste cooking oil containing unsaturated fatty acid like linoleic acid is used as diesel engine fuel, gum substances like glycerin produced by oxidization or polymerization of these source materials would become a hindrance to a fuel supply system of the diesel engine which includes a fuel filter, a fuel injection nozzle and a fuel pump, for example, causing the occurrence of knocking, fluctuations in engine speed and a reduction in engine speed and making it impossible to operate the diesel engine in a stable fashion. Moreover, this method used to cause such problems as a breakdown of valves and pistons.

The present invention has been made in light of the aforementioned problems. Accordingly, it is an object of the present invention to provide a fuel supply control device for a diesel engine that makes it possible to stably operate the diesel engine for an extended period of time using mixed oil produced by mixing unpurified waste oil of which quality has not been improved by esterification, for instance, and petroleum-based fuel oil and greatly increase the ratio of use of waste oil.

Solution to Problem

To achieve the aforementioned object, a diesel engine fuel supply control device of the present invention mixes petroleum-based fuel oil and unpurified waste oil and supplies mixed oil thus produced to a diesel engine as fuel thereof. The diesel engine fuel supply control device comprises a first fuel tank for storing the waste oil; a second fuel tank for storing the petroleum-based fuel oil; fuel mixing means for mixing the waste oil and the petroleum-based fuel oil; waste oil quantity regulating means for regulating the amount of the waste oil supplied from the first fuel tank to the fuel mixing means; petroleum-based fuel oil quantity regulating means for regulating the amount of the petroleum-based fuel oil supplied from the second fuel tank to the fuel mixing means; fuel supply means for supplying the mixed oil mixed by the fuel mixing means to the diesel engine; engine speed sensing means for detecting the speed of the diesel engine; engine speed fluctuation calculating means for calculating the amount of fluctuation in the detected engine speed with respect to a target engine speed of the diesel engine; engine speed fluctuation determination means which determines that the amount of engine speed fluctuation represents first fluctuation amount determination information when the amount of engine speed fluctuation calculated by the engine speed fluctuation calculating means has a value smaller than a first set value, determines that the amount of engine speed fluctuation represents second fluctuation amount determination information when the amount of engine speed fluctuation falls within a range in which the amount of engine speed fluctuation is equal to or larger than the first set value but less than a predefined second set value which is larger than the first set value, and determines that the amount of engine speed fluctuation represents third fluctuation amount determination information when the amount of engine speed fluctuation calculated by the engine speed fluctuation calculating means matches the second set value; operating state determination means which determines that a state in which the diesel engine is run in accordance with the first fluctuation amount determination information is a first operating state, determines that a state in which the diesel engine is run in accordance with the second fluctuation amount determination information is a second operating state, and determines that a state in which the diesel engine is run in accordance with the third fluctuation amount determination information is a third operating state; mixing ratio setting means for setting the ratio of mixing the waste oil and the petroleum-based fuel oil in accordance with the first, second and third operating states on the basis of the individual pieces of fluctuation amount determination information fed from the engine speed fluctuation determination means; and first control means for regulating the amount of the waste oil supplied from the first fuel tank to the fuel mixing means and the amount of the petroleum-based fuel oil supplied from the second fuel tank to the fuel mixing means by controlling the waste oil quantity regulating means and the petroleum-based fuel oil quantity regulating means on the basis of the mixing ratio set by the mixing ratio setting means.

Advantageous Effects of Invention

According to the diesel engine fuel supply control device of the present invention, it is possible to stably operate a diesel engine for an extended period of time using mixed oil produced by mixing unpurified waste oil of which quality has not been improved by esterification, for instance, and petroleum-based fuel oil and greatly increase the ratio of use of waste oil.

DESCRIPTION OF EMBODIMENTS

An embodiment of the present invention is described hereinbelow with reference to the drawings.

A fuel supply control device for a diesel engine described in this embodiment is configured to supply mixed oil as fuel of the diesel engine, wherein the mixed oil is produced by mixing petroleum-based fuel oil like light oil with waste oil like unpurified waste cooking oil of which quality has not been improved by esterification as in conventional approaches.

Figure 1:
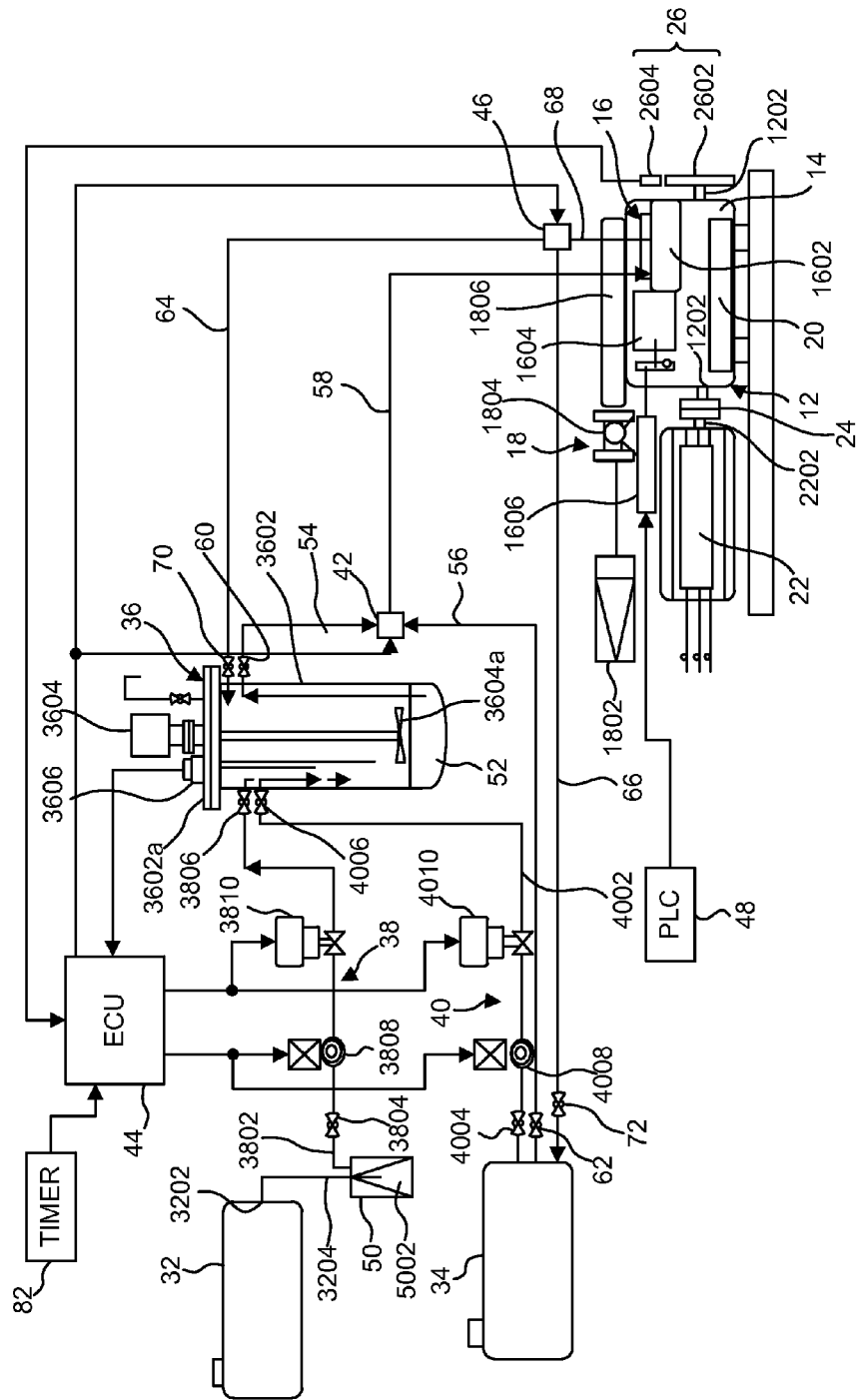
FIG. 1 is an explanatory diagram depicting an overall configuration of a fuel supply control device for a diesel engine according to an embodiment of the present invention.

As depicted in FIG. 1, a diesel engine 12 to which such a fuel supply control device is applied includes an engine body 14 which produces rotational energy by combusting a gaseous mixture produced by mixing air with mixed oil made of petroleum-based fuel oil and waste oil, or petroleum-based fuel oil alone, fuel supply means 16 for supplying the mixed oil containing petroleum-based fuel oil and waste oil, or petroleum-based fuel oil alone, to the engine body 14, air supply means 18 for supplying air to the engine body 14 and an exhaust manifold 20.

The fuel supply means 16 includes a fuel supply pump 1602, an injection quantity control unit (governor) 1604 and an actuator 1606.

The fuel supply pump 1602 serves to supply the mixed oil or petroleum-based fuel oil fed from a later-described fuel mixing tank 3602 to each of fuel injectors (not shown) of the engine body 14.

The injection quantity control unit 1604 which is driven by the actuator 1606 controlled by a programmable logic controller (PLC) 48 serves to regulate the amount of fuel injected from the fuel supply pump 1602 through each of the unillustrated fuel injectors.

The air supply means 18 includes an air cleaner 1802, a supercharger 1804 and an intake manifold 1806. The air cleaner 1802 serves to remove dust from air supplied to the engine body 12.

The intake manifold 1806 serves to evenly distribute air filtered by the air cleaner 1802 to each cylinder of the engine body 12.

The supercharger 1804 is an air compressor which compresses air to be supplied to the engine body 12 through the air cleaner 1802 and the intake manifold 1806 and supplies air of which pressure has been increased to a level higher than atmospheric pressure to each cylinder of the engine body 12.

The exhaust manifold 20 serves to collect exhaust gas from each cylinder of the engine body 12 and send the exhaust gas to a muffler.

The diesel engine 12 thus structured is used as a driving source of a generator and, thus, a rotary shaft 2202 of a three-phase AC generator 22 is connected to one end of a rotary shaft 1202 of the diesel engine 12 via a coupling 24. Also, the engine body 12 is provided with an engine speed sensing device (which corresponds to engine speed sensing means mentioned in the appended claims) 26 for detecting the speed of the diesel engine 12.

The engine speed sensing device 26 which is provided at one end of the rotary shaft 1202 of the diesel engine 12 includes a rotary disk 2602 having protrusions formed at regular intervals all along an outer periphery thereof and a rotation sensor 2604 disposed close to the protrusions of the rotary disk 2602. The engine speed sensing device 26 is configured such that the rotation sensor 2604 generates a sine-wave signal corresponding to the protrusions of the rotary disk 2602 as a result of rotation thereof and this signal is taken into a later-described ECU 44 as information to be used for calculating the speed of the diesel engine 12.

Next, the configuration of the diesel engine fuel supply control device presented in the present embodiment is described with reference to FIG. 1.

The fuel supply control device for the diesel engine includes, as depicted in FIG. 1, a first fuel tank 32 for storing waste oil, a second fuel tank 34 for storing petroleum-based fuel oil, fuel mixing means 36, waste oil quantity regulating means 38, petroleum-based fuel oil quantity regulating means 40, a fuel switching valve (which corresponds to fuel switching means mentioned in the appended claims) 42, the electronic control unit (ECU) 44 and a fuel return switching valve 46.

A filter 50 is connected to a waste oil outlet 3202 of the first fuel tank 32 via a waste oil outflow pipe 3204. This filter 50 which includes a filtering material 5002 having approximately a 200 mesh size serves to collect substances produced by oxidization and deterioration of waste oil and other impurities floating in the waste oil flowing out of the first fuel tank 32. Provision of this filter 50 makes it possible to place waste oil collected from restaurants or individual homes, that is, waste oil of which quality has not been improved by esterification, for instance, directly into the first fuel tank 32 and use this waste oil as diesel engine fuel.

The fuel mixing means 36 serves to mix waste oil fed from the first fuel tank 32 through the filter 50 and petroleum-based fuel oil fed from the second fuel tank 34. The fuel mixing means 36 includes the fuel mixing tank 3602 of which upper end opening is closed by a lid member 3602*a*, a stirrer 3604 mounted on the lid member 3602a having stirring blades 3604a for stirring and mixing waste oil and petroleum-based fuel oil introduced into the fuel mixing tank 3602, and a liquid level meter 3606 mounted on the lid member 3602a for detecting the liquid level of waste oil 52 held in the fuel mixing tank 3602 at two points, that is, an upper limit level and a lower limit level.

Also, the fuel supply control device is configured such that the stirrer 3604 is controllably started and stopped by the ECU 44 and signals indicating the upper limit level and the lower limit level detected by the liquid level meter 3606 are taken into the ECU 44 and used for controlling the waste oil quantity regulating means 38, the petroleum-based fuel oil quantity regulating means 40 and the stirrer 3604.

The waste oil quantity regulating means 38 includes a pipe 3802 for waste oil connecting the filter 50 and the fuel mixing tank 3602 in an interconnected state, on-off valves 3804, 3806 provided at an upstream end side and at a downstream end side of this pipe 3802, respectively, an electromagnetic pump 3808 provided in a portion of the pipe 3802 between the on-off valve 3804 and the on-off valve 3806 for feeding waste oil which has passed through the filter 50 to the fuel mixing tank 3602, and a flow control valve 3810 provided downstream of the electromagnetic pump 3808 in a portion of the pipe 3802 between the on-off valve 3804 and the on-off valve 3806 for controlling flow rate of waste oil fed from the electromagnetic pump 3808 to the fuel mixing tank 3602. Also, the fuel supply control device is configured such that the electromagnetic pump 3808 and the flow control valve 3810 are controlled by the ECU 44.

The petroleum-based fuel oil quantity regulating means 40 includes a pipe 4002 for petroleum-based fuel oil connecting the second fuel tank 34 and the fuel mixing tank 3602 in an interconnected state, on-off valves 4004, 4006 provided at an upstream end side and at a downstream end side of this pipe 4002, respectively, an electromagnetic pump 4008 provided in a portion of the pipe 4002 between the on-off valve 4004 and the on-off valve 4006 for feeding petroleum-based fuel oil from the second fuel tank 34 to the fuel mixing tank 3602, and a flow control valve 4010 provided on an outlet side of the electromagnetic pump 4008 in a portion of the pipe 4002 between the on-off valve 4004 and the on-off valve 4006 for controlling flow rate of petroleum-based fuel oil fed from the electromagnetic pump 4008 to the fuel mixing tank 3602. Also, the fuel supply control device is configured such that the electromagnetic pump 4008 and the flow control valve 4010 are controlled by the ECU 44.

A mixed oil supply pipe 54 connected to the fuel mixing tank 3602 and a petroleum-based fuel oil supply pipe 56 connected to the second fuel tank 34 are connected to a fuel supply pipe 58 which is connected to a fuel inlet side of the fuel supply pump 1602 of the diesel engine 12 via the fuel switching valve 42. The fuel supply control device is configured such that the fuel switching valve 42 switches and connects the fuel supply pipe 58 of the fuel supply pump 1602 to the mixed oil supply pipe 54 of the fuel mixing tank 3602 or the petroleum-based fuel oil supply pipe 56 of the second fuel tank 34 in accordance with a command signal output from the ECU 44. Also, an on-off valve 60 is provided at an upstream side of the mixed oil supply pipe 54 and, further, an on-off valve 62 is provided at an upstream side of the petroleum-based fuel oil supply pipe 56.

A mixed oil return pipe 64 connected to the fuel mixing tank 3602 and a petroleum-based fuel oil return pipe 66 connected to the second fuel tank 34 are connected to a fuel return pipe 68 which is connected to a fuel return port of the fuel supply pump 1602 of the diesel engine 12 via the fuel return switching valve 46. The fuel supply control device is configured such that the fuel return switching valve 46 switches and connects the fuel return pipe 68 of the fuel supply pump 1602 to the mixed oil return pipe 64 of the fuel mixing tank 3602 or the petroleum-based fuel oil return pipe 66 of the second fuel tank 34 in accordance with a command signal output from the ECU 44. Also, an on-off valve 70 is provided at an upstream side of the mixed oil return pipe 64 and, further, an on-off valve 72 is provided at an upstream side of the petroleum-based fuel oil return pipe 66.

Incidentally, excess waste oil supplied to each fuel injection nozzle of the engine by the fuel supply pump 1602 is returned to the fuel mixing tank 3602 through the fuel return switching valve 46 and the return pipe 64. Also, excess petroleum-based fuel oil supplied to each fuel injection nozzle of the engine by the fuel supply pump 1602 is returned to the second fuel tank 34 through the fuel return switching valve 46 and the return pipe 66.

Figure 2:
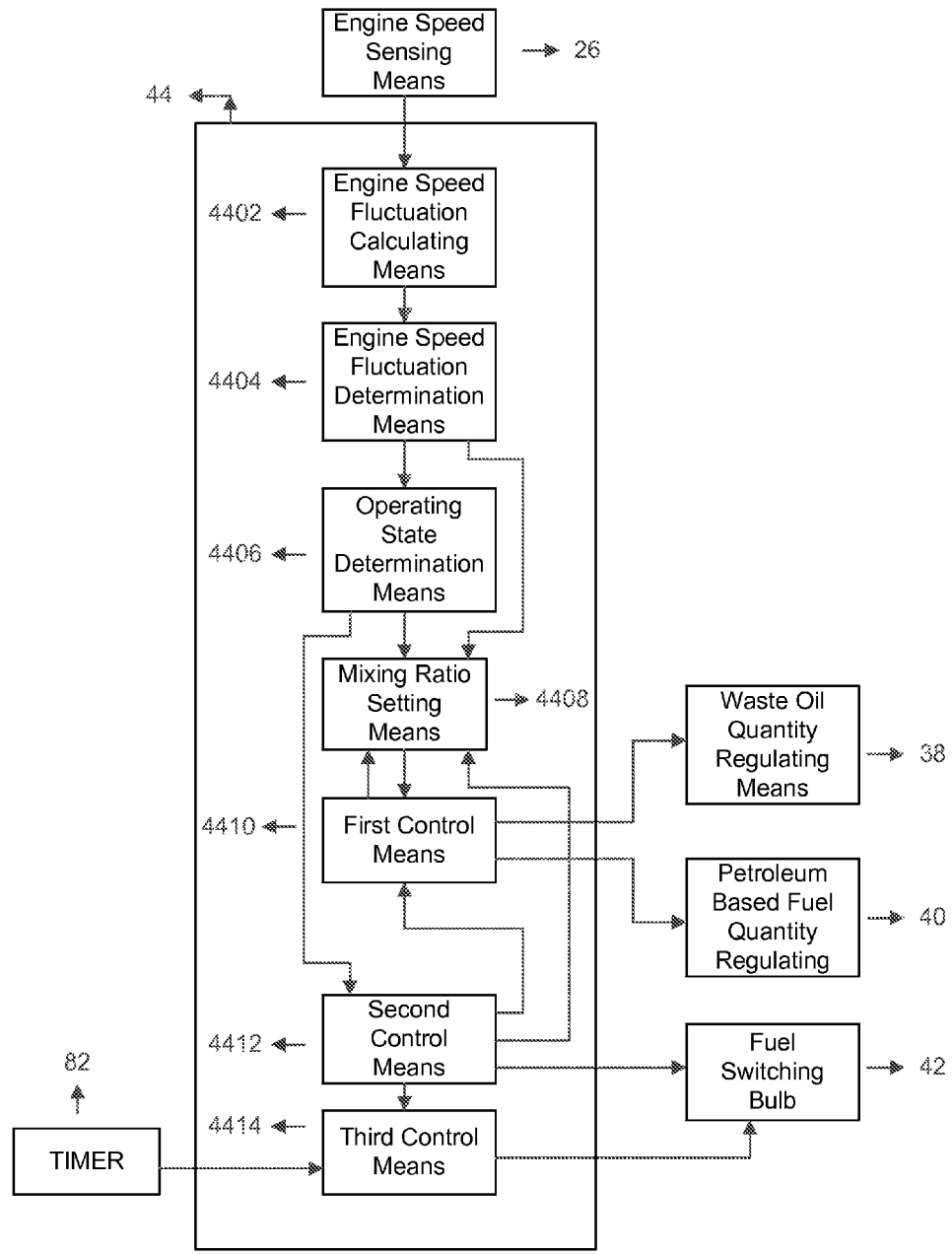
FIG. 2 is a functional block diagram of the fuel supply control device for the diesel engine according to the embodiment of the present invention.

The ECU 44 serves to manage and control the entire fuel supply control device of the diesel engine. Functionally, the ECU 44 includes, as depicted in FIG. 2, engine speed fluctuation calculating means 4402, engine speed fluctuation determination means 4404, operating state determination means 4406, mixing ratio setting means 4408, first control means 4410, second control means 4412 and third control means 4414.

The engine speed fluctuation calculating means 4402 serves to calculate a true engine speed of the diesel engine on the basis of a signal output from the engine speed sensing device 26 under conditions where the diesel engine 12 is run by mixed oil containing waste oil and petroleum-based fuel oil and then calculate the amount of fluctuation in the true engine speed with respect to a target engine speed (e.g., 1500 rpm) of the diesel engine 12.

When the amount of engine speed fluctuation calculated by the engine speed fluctuation calculating means 4402 has a value smaller than a predefined first set value (e.g., 5 rpm), the engine speed fluctuation determination means 4404 determines that this amount of engine speed fluctuation represents first fluctuation amount determination information. Also, when the amount of engine speed fluctuation calculated by the engine speed fluctuation calculating means 4402 falls within a range in which the amount of engine speed fluctuation is equal to or larger than the first set value but less than a predefined second set value (e.g., 10 rpm) which is larger than the first set value, the engine speed fluctuation determination means 4404 determines that the amount of engine speed fluctuation represents second fluctuation amount determination information. Further, when the amount of engine speed fluctuation calculated by the engine speed fluctuation calculating means 4402 matches the second set value, the engine speed fluctuation determination means 4404 determines that the amount of engine speed fluctuation represents third fluctuation amount determination information. Further, when the engine speed fluctuation determination means 4404 determines that the amount of engine speed fluctuation has a value exceeding the second set value, the engine speed fluctuation determination means 4404 determines that the amount of engine speed fluctuation represents fourth fluctuation amount determination information.

The second control means 4412 outputs a switching control command to the fuel switching valve 42 on the basis of these pieces of fluctuation amount determination information to supply petroleum-based fuel oil from the second fuel tank 34 for a specified period of time, and thereby executes a function of running the diesel engine 12 with petroleum-based fuel oil alone and purging the above-described fuel supply system with the petroleum-based fuel oil.

The operating state determination means 4406 determines that a state in which the diesel engine 12 is run in accordance with the aforementioned first fluctuation amount determination information is a first operating state. Also, the operating state determination means 4406 determines that a state in which the diesel engine 12 is run in accordance with the aforementioned second fluctuation amount determination information is a second operating state. Further, the operating state determination means 4406 determines that a state in which the diesel engine 12 is run in accordance with the aforementioned third fluctuation amount determination information is a third operating state. Also, the operating state determination means 4406 determines that a state in which the diesel engine 12 is run in accordance with the aforementioned fourth fluctuation amount determination information is a fourth operating state.

The mixing ratio setting means 4408 serves to set the ratio of mixing waste oil and petroleum-based fuel oil in accordance with the aforementioned first, second, third and fourth operating states on the basis of the individual pieces of fluctuation amount determination information fed from the engine speed fluctuation determination means 4404.

The first control means 4410 serves to regulate the amount of waste oil supplied from the first fuel tank 32 to the fuel mixing tank 3602 via the filter 50 and the amount of petroleum-based fuel oil supplied from the second fuel tank 34 to the fuel mixing tank 3602 by controlling the electromagnetic pump 3808 and the flow control valve 3810 of the waste oil quantity regulating means 38 and the electromagnetic pump 4008 and the flow control valve 4010 of the petroleum-based fuel oil quantity regulating means 40 on the basis of the mixing ratio set by the mixing ratio setting means 4408.

The second control means 4412 controllably varies the mixing ratio set by the mixing ratio setting means 4408 in a stepwise fashion so that the ratio of mixing waste oil is increased by outputting a control command to the mixing ratio setting means 4408 when the operating state determination means 4406 determines that the diesel engine 12 is in the aforementioned first operating state. The second control means 4412 then causes the first control means 4410 to regulate the amount of waste oil supplied from the first fuel tank 32 to the fuel mixing tank 3602 via the filter 50 by controlling the electromagnetic pump 3808 and the flow control valve 3810 of the waste oil quantity regulating means 38 and the electromagnetic pump 4008 and the flow control valve 4010 of the petroleum-based fuel oil quantity regulating means 40 in accordance with the stepwise mixing ratio.

Also, the second control means 4412 controls the electromagnetic pump 3808 and the flow control valve 3810 of the waste oil quantity regulating means 38 and the electromagnetic pump 4008 and the flow control valve 4010 of the petroleum-based fuel oil quantity regulating means 40 so that the current mixing ratio set by the mixing ratio setting means 4408 is maintained by outputting a control command to the first control means 4410 when the operating state determination means 4406 determines that the diesel engine 12 is in the aforementioned second operating state.

Also, the second control means 4412 has a function to supply petroleum-based fuel oil alone from the second fuel tank 34 for a specified period of time (e.g., approximately 1 minute) to run the diesel engine 12 with petroleum-based fuel oil by outputting a switching control command to the fuel switching valve 42 to thereby purge (clean) the fuel supply system including the fuel pump 1602 and injection nozzles constituting the fuel supply means 16 with petroleum-based fuel oil when the operating state determination means 4406 determines that the diesel engine 12 is in the aforementioned third operating state.

The second control means 4412 also has a function to supply petroleum-based fuel oil alone from the second fuel tank 34 for a specified period of time (e.g., approximately 10 minutes) to run the diesel engine 12 with petroleum-based fuel oil alone by outputting a switching control command to the fuel switching valve 42 to thereby purge (clean) the fuel supply system including the fuel pump 1602 and the injection nozzles constituting the fuel supply means 16 with petroleum-based fuel oil when the operating state determination means 4406 determines that the diesel engine 12 is in the aforementioned fourth operating state. Further, the second control means 4412 has a control function to vary the mixing ratio set by the mixing ratio setting means 4408 in a stepwise fashion so that the ratio of mixing waste oil is decreased by outputting a mixing ratio altering command to the mixing ratio setting means 4408 each time the aforementioned fuel supply system is purged with petroleum-based fuel oil until the speed of the diesel engine 12 reaches the target engine speed in a stable fashion when the diesel engine 12 is in the fourth operating state.

The third control means 4414 serves to determine whether a timer 82 is set in an operating state, and supply petroleum-based fuel oil alone from the second fuel tank 34 for a specified period of time (e.g., 1 minute or a few minutes within one hour) by outputting a switching control command from the timer 82 to the fuel switching valve 42 each time a point in time set in the timer 82 at intervals of unit time is reached when the timer 82 is set in the operating state, to thereby run the diesel engine 12 with petroleum-based fuel oil and purge the fuel supply system including the fuel pump 1602 and the injection nozzles constituting the fuel supply means 16 with petroleum-based fuel oil.

The timer 82 serves to manage operating time of the diesel engine 12 and purging time required for purging the fuel supply system including the fuel pump 1602 and the injection nozzles constituting the fuel supply means 16 with petroleum-based fuel oil for a specified period of time (e.g., 1 minute) at intervals of unit time (e.g., 1 hour).

Incidentally, the ECU 44 is configured with a microcomputer in which a CPU, a ROM storing a control program and various kinds of data, a RAM which provides a working area and an interface unit which interfaces with peripheral circuitry, for example, are interconnected by a bus. The aforementioned CPU can realize the engine speed fluctuation calculating means 4402, the engine speed fluctuation determination means 4404, the operating state determination means 4406, the mixing ratio setting means 4408, the first control means 4410, the second control means 4412 and the third control means 4414 by executing the control program.

Figure 3:
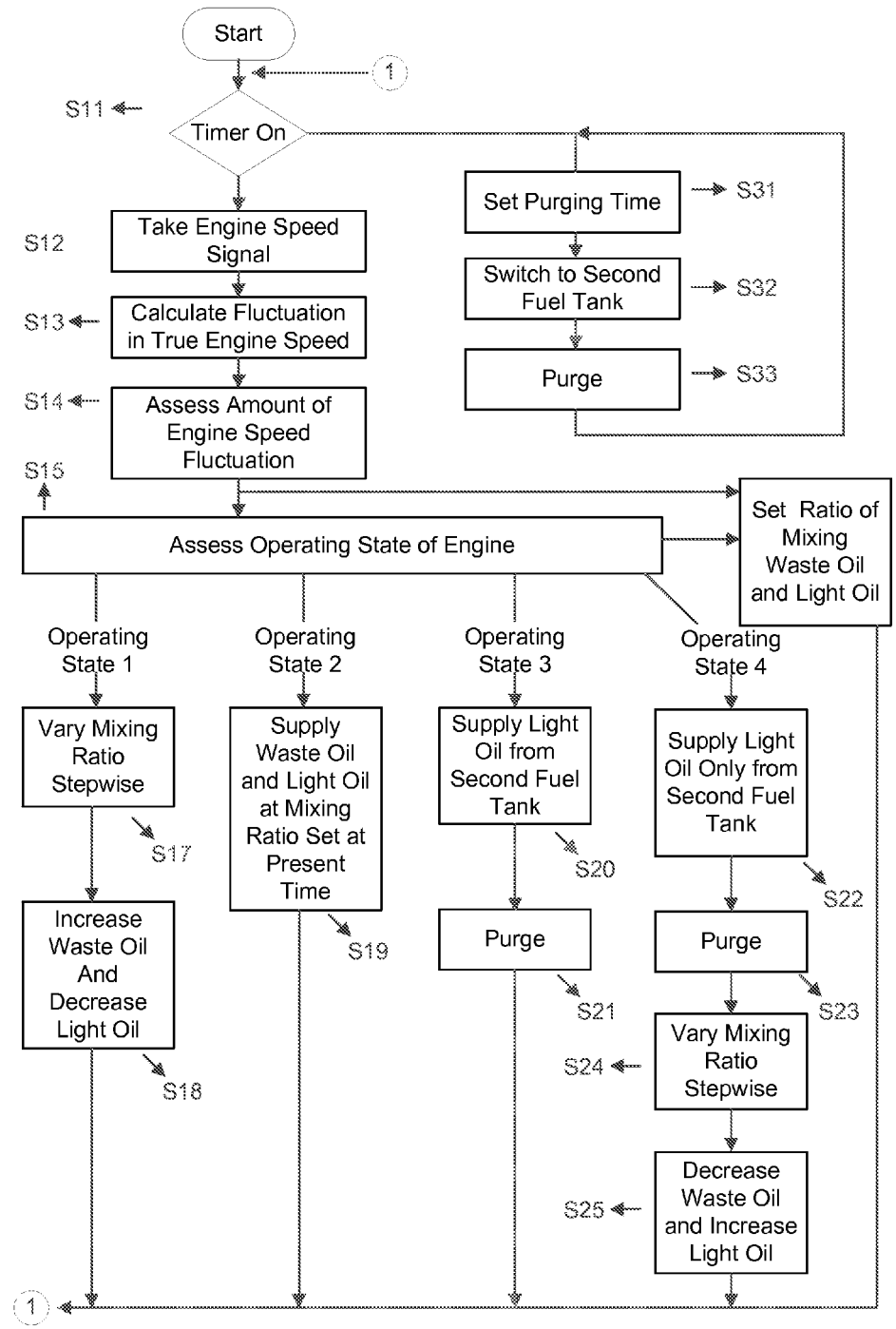
FIG. 3 is a flowchart used for describing processing operation performed by the fuel supply control device for the diesel engine according to the embodiment of the present invention.

Next, processing operation performed by the fuel supply control device for the diesel engine according to the present embodiment is described with reference to FIG. 3.

When the ECU 44 begins to operate under conditions where the diesel engine 12 is driven to turn by mixed oil produced by mixing waste oil and petroleum-based fuel oil, it is first determined whether the timer 82 is in an ON state (step S11).

If it is determined that the timer 82 has not been turned on in step 11, a signal generated by the engine speed sensing device 26 is taken into the ECU 44 (step S12). Consequently, the engine speed fluctuation calculating means 4402 calculates the true engine speed of the diesel engine on the basis of the signal taken into the ECU 44 from the engine speed sensing device 26 and then calculates the amount of fluctuation in the true engine speed with respect to the target engine speed (e.g., 1500 rpm) of the diesel engine 12 on the basis of the true engine speed (step S13).

Next, the engine speed fluctuation determination means 4404 determines that the amount of engine speed fluctuation represents the first fluctuation amount determination information when the amount of fluctuation in engine speed calculated by the engine speed fluctuation calculating means 4402 is less than 5 rpm which is smaller than the first set value. Also, the engine speed fluctuation determination means 4404 determines that the amount of engine speed fluctuation represents the second fluctuation amount determination information when the amount of engine speed fluctuation is equal to or larger than the first set value but less than the second set value, that is, equal to or larger than 5 rpm but less than 10 rpm, for example. Also, the engine speed fluctuation determination means 4404 determines that the amount of engine speed fluctuation represents the third fluctuation amount determination information when the amount of engine speed fluctuation matches the second set value (10 rpm). Further, the engine speed fluctuation determination means 4404 determines that the amount of engine speed fluctuation represents the fourth fluctuation amount determination information when the amount of engine speed fluctuation has a value exceeding the second set value, that is, equal to or larger than 10 rpm, for example (step S14).

The operating state determination means 4406 determines that the state in which the diesel engine 12 is run in accordance with the first fluctuation amount determination information is the first operating state. Further, the operating state determination means 4406 determines that the state in which the diesel engine 12 is run in accordance with the second fluctuation amount determination information is the second operating state. Also, the operating state determination means 4406 determines that the state in which the diesel engine 12 is run in accordance with the third fluctuation amount determination information is the third operating state. Further, the operating state determination means 4406 determines that the state in which the diesel engine 12 is run in accordance with the fourth fluctuation amount determination information is the fourth operating state (step S15).

Here, the first operating state represents an extremely satisfactory operating state where the amount of engine speed fluctuation is less than 5 rpm which is smaller than the first set value and knocking does not occur. Also, the second operating state represents a relatively satisfactory operating state where the amount of engine speed fluctuation falls within a range in which the amount of engine speed fluctuation is equal to or larger than 5 rpm but less than 10 rpm, that is, equal to or larger than the first set value but less than the second set value and knocking does not occur. Further, the third operating state represents an operating state where the amount of engine speed fluctuation matches the second set value (10 rpm) at which a slight anomaly in engine speed is likely to occur although knocking does not occur. The fourth operating state represents an operating state where the amount of engine speed fluctuation has a value exceeding the second set value (10 rpm) at which knocking occurs and a severe anomaly in engine speed occurs.

Subsequently, the mixing ratio setting means 4408 sets the ratio of mixing waste oil and petroleum-based fuel oil in accordance with the aforementioned first, second, and third operating states on the basis of the first, second, third and fourth fluctuation amount determination information fed from the engine speed fluctuation determination means 4404 (step S16).

If the operating state determination means 4406 determines that the operating state of the diesel engine 12 is the first operating state, the second control means 4412 controllably varies the mixing ratio set by the mixing ratio setting means 4408 in an increasing direction in a stepwise fashion so that the ratio of mixing waste oil is increased by outputting a control command to the first control means 4410 (step S17). Then, on the basis of this mixing ratio which is varied stepwise, the first control means 4410 controls the waste oil quantity regulating means 38 and the petroleum-based fuel oil quantity regulating means 40 to increase the amount of waste oil supplied to the fuel mixing tank 3602 under the control of the waste oil quantity regulating means 38 by a specific amount (e.g., +5% in terms of the mixing ratio) stepwise and at the same time decrease the amount of petroleum-based fuel oil supplied to the fuel mixing tank 3602 under the control of the petroleum-based fuel oil quantity regulating means 40 by a specific amount (e.g., −5% in terms of the mixing ratio) stepwise (step S18). Subsequently, the ECU 44 is returned to step S11. Thereafter, the ECU 44 re-executes the above-described operations of steps S17 and S18 until the amount of engine speed fluctuation becomes equal to the first set value.

Therefore, it is possible to increase the mixing ratio of waste oil to approximately 90% if the waste oil is of a relatively high quality, effectively use waste oil and increase the ratio of use of waste oil.

If the operating state determination means 4406 determines that the operating state of the diesel engine 12 is the second operating state, the second control means 4412 controls the waste oil quantity regulating means 38 and the petroleum-based fuel oil quantity regulating means 40 so that the mixing ratio set at a present point in time by the mixing ratio setting means 4408 is maintained by outputting a control command to the first control means 4410 to thereby control the amount of waste oil supplied to the fuel mixing tank 3602 under the control of the waste oil quantity regulating means 38 and the amount of petroleum-based fuel oil supplied to the fuel mixing tank 3602 under the control of the petroleum-based fuel oil quantity regulating means 40 (step S19). Subsequently, the ECU 44 is returned to step S11. Therefore, it is made possible to stably operate the diesel engine for an extended period of time using unpurified waste oil, effectively use waste oil and increase the ratio of use of waste oil.

Also, if the operating state determination means 4406 determines that the operating state of the diesel engine 12 is the third operating state, the second control means 4412 outputs a switching control command to the fuel switching valve 42 to cause the fuel switching valve 42 to operate, thereby switching a fuel supply channel from the fuel mixing tank 3602 to the fuel pump 1602 of the diesel engine 12 to a channel from the second fuel tank 34 (step S20). The second control means 4412 then supplies petroleum-based fuel oil from the second fuel tank 34 at 100 rpm for a specified period of time (e.g., approximately 1 minute). As a result, the diesel engine 12 is operated by petroleum-based fuel oil alone and the fuel supply system of the fuel supply means 16 is purged with petroleum-based fuel oil (step S21). Subsequently, the ECU 44 is returned to step S11. Therefore, it is made possible to stably operate the diesel engine for an extended period of time using unpurified waste oil, effectively use waste oil and increase the ratio of use of waste oil. Moreover, it is possible to prevent the occurrence of knocking, fluctuations in engine speed and a reduction in engine speed which may cause a problem related to power generation by a generator by purging the fuel supply system of the diesel engine 12 by use of petroleum-based fuel oil like light oil.

Also, if the operating state determination means 4406 determines that the operating state of the diesel engine 12 is the fourth operating state, the second control means 4412 outputs a switching control command to the fuel switching valve 42 to cause the fuel switching valve 42 to operate, thereby switching the fuel supply channel from the fuel mixing tank 3602 to the fuel pump 1602 of the diesel engine 12 to the channel from the second fuel tank 34 (step S22). The second control means 4412 then supplies petroleum-based fuel oil from the second fuel tank 34 at 100 rpm for a specified period of time (e.g., approximately 10 minutes). As a result, the diesel engine 12 is operated by petroleum-based fuel oil alone and the fuel supply system of the fuel supply means 16 is purged with petroleum-based fuel oil (step S23). Further, the second control means 4412 controllably varies the mixing ratio set by the mixing ratio setting means 4408 in a decreasing direction in a stepwise fashion so that the ratio of mixing waste oil is decreased by outputting a control command to the first control means 4410 when the diesel engine 12 is in the fourth operating state (step S24). Then, on the basis of this mixing ratio which is varied stepwise, the first control means 4410 controls the waste oil quantity regulating means 38 and the petroleum-based fuel oil quantity regulating means 40 to decrease the amount of waste oil supplied to the fuel mixing tank 3602 under the control of the waste oil quantity regulating means 38 by a specific amount (e.g., −5% in terms of the mixing ratio) stepwise and at the same time increase the amount of petroleum-based fuel oil supplied to the fuel mixing tank 3602 under the control of the petroleum-based fuel oil quantity regulating means 40 by a specific amount (e.g., +5% in terms of the mixing ratio) stepwise (step S25). Subsequently, the ECU 44 is returned to step S11. Thereafter, the ECU 44 re-executes the above-described operations of steps S24 and S25 until the amount of engine speed fluctuation becomes equal to the second set value or the second set value.

Therefore, it is possible to prevent the occurrence of knocking, fluctuations in engine speed and a reduction in engine speed which may cause a problem related to power generation by a generator by purging the fuel supply system of the diesel engine 12 by use of petroleum-based fuel oil like light oil. Moreover, it is made possible to stably operate the diesel engine for an extended period of time even when low-quality waste oil is used as diesel engine fuel.

If it is determined that the timer 82 has been turned on in step S11 described above, unit time, such as purging time indicating that the fuel supply system of the diesel engine 12 should be purged at 1-hour intervals, for example, is set in the timer 82 (step S31). Each time the purging time set in the timer 82 is reached at 1-hour intervals, the timer 82 outputs a control command to the third control means 4414 so that the fuel switching valve 42 is operated by a control signal from the third control means 4414, thereby switching the fuel supply channel from the fuel mixing tank 3602 to the fuel pump 1602 of the diesel engine 12 to the channel from the second fuel tank 34 (step S32). The third control means 4414 then supplies petroleum-based fuel oil from the second fuel tank 34 at 100 rpm for a specified period of time (e.g., approximately 1 minute). Subsequently, the diesel engine 12 is operated by petroleum-based fuel oil alone and the fuel supply system of the fuel supply means 16 is purged with petroleum-based fuel oil (step S33). Thereafter, the ECU 44 re-executes the above-described operations of steps S31 to S33 at intervals of the unit time set in the timer 82. Therefore, it is possible to prevent the occurrence of knocking, fluctuations in engine speed and a reduction in engine speed which may cause a problem related to power generation by a generator by periodically purging the fuel supply system of the diesel engine 12 by use of the timer 82 and petroleum-based fuel oil like light oil. Additionally, it is made possible to stably operate the diesel engine for an extended period of time and increase the ratio of use of waste oil.

Incidentally, the fuel supply control device for the diesel engine of the present invention is applicable to driving not only a diesel engine for a generator but also other loads such as pumps. In addition, the diesel engine speed is not limited to 1500 rpm but the invention is applicable to engines whose speed is 1800 rpm, for example.

Also, the first and second set values are not limited to the values indicated in the foregoing embodiments but the present invention may be varied or altered in various ways without departing from the scope and spirit of invention defined in the appended claims.

INDUSTRIAL APPLICABILITY

The present invention, which is related to a fuel supply control device for a diesel engine capable of stably operating the diesel engine for an extended period of time using mixed oil produced by mixing unpurified waste oil of which quality has not been improved by esterification, for instance, and petroleum-based fuel oil and greatly increasing the ratio of use of waste oil, has industrial applicability.

REFERENCE SIGNS LIST

12. Diesel engine
14. Engine body
16. Fuel supply means
18. Air supply means
26. Engine speed sensing device
32. First fuel tank
34. Second fuel tank
36. Fuel mixing means
38. Waste oil quantity regulating means
40. Petroleum-based fuel oil quantity regulating means
42. Fuel switching valve
44. ECU
4402. Engine speed fluctuation calculating means
4404. Engine speed fluctuation determination means
4406. Operating state determination means
4408. Mixing ratio setting means
4410. First control means
4412. Second control means
4414. Third control means
82. Timer
FIG. 1
82. TIMER
FIG. 2
26. ENGINE SPEED SENSING MEANS
38. WASTE OIL QUANTITY REGULATING MEANS
40. PETROLEUM-BASED FUEL OIL QUANTITY REGULATING MEANS
42. FUEL SWITCHING VALVE
82. TIMER
4402. ENGINE SPEED FLUCTUATION CALCULATING MEANS
4404. ENGINE SPEED FLUCTUATION DETERMINATION MEANS
4406. OPERATING STATE DETERMINATION MEANS
4408. MIXING RATIO SETTING MEANS
4410. FIRST CONTROL MEANS
4412. SECOND CONTROL MEANS
4414. THIRD CONTROL MEANS FIG. 3
STARS
S11 TIMER ON?
S12 TAKE IN ENGINE SPEED SIGNAL
S13 CALCULATE AMOUNT OF FLUCTUATION IN TRUE ENGINE SPEED
S14 ASSESS AMOUNT OF ENGINE SPEED FLUCTUATION
S15 ASSESS OPERATING STATE OF DIESEL ENGINE
FIRST OPERATING STATE
SECOND OPERATING STATE
THIRD OPERATING STATE
FOURTH OPERATING STATE
S16 SET RATIO OF MIXING WASTE OIL AND LIGHT OIL
S17 VARY MIXING RATIO STEPWISE
S18 INCREASE WASTE OIL AND DECREASE LIGHT OIL
S19 SUPPLY WASTE OIL AND LIGHT OIL AT MIXING RATIO SET AT PRESENT TIME
S20 SUPPLY LIGHT OIL ONLY FROM SECOND FUEL TANK
S21 PURGE
S22 SUPPLY LIGHT OIL ONLY FROM SECOND FUEL TANK
S23 PURGE
S24 VARY MIXING RATIO STEPWISE
S25 DECREASE WASTE OIL AND INCREASE LIGHT OIL
S31 SET PURGING TIME
S32 SWITCH TO SECOND FUEL TANK
S33 PURGE

The invention claimed is:

1. A diesel engine fuel supply control device which mixes petroleum-based fuel oil and unpurified waste oil and supplies mixed oil thus produced to a diesel engine as fuel thereof, the diesel engine fuel supply control device comprising:
   a first fuel tank for storing the waste oil;
   a second fuel tank for storing the petroleum-based fuel oil;
   fuel mixing means for mixing the waste oil and the petroleum-based fuel oil;
   waste oil quantity regulating means for regulating an amount of the waste oil supplied from the first fuel tank to the fuel mixing means;
   petroleum-based fuel oil quantity regulating means for regulating an amount of the petroleum-based fuel oil supplied from the second fuel tank to the fuel mixing means;
   fuel supply means for supplying the mixed oil mixed by the fuel mixing means to the diesel engine;
   engine speed sensing means for detecting a speed of the diesel engine;
   engine speed fluctuation calculating means for calculating the amount of fluctuation in the detected engine speed with respect to a target engine speed of the diesel engine;
   engine speed fluctuation determination means which determines that an amount of engine speed fluctuation represents first fluctuation amount determination information when the amount of engine speed fluctuation calculated by the engine speed fluctuation calculating means has a value smaller than a first set value, determines that the amount of engine speed fluctuation represents second fluctuation amount determination information when the amount of engine speed fluctuation falls within a range in which the amount of engine speed fluctuation is equal to or larger than the first set value but less than a pre-defined second set value which is larger than the first set value, and determines that the amount of engine speed fluctuation represents third fluctuation amount determination information when the amount of engine speed fluctuation calculated by the engine speed fluctuation calculating means matches the second set value;
   operating state determination means which determines that a state in which the diesel engine is run in accordance with the first fluctuation amount determination information is a first operating state, determines that a state in which the diesel engine is run in accordance with the second fluctuation amount determination information is a second operating state, and determines that a state in which the diesel engine is run in accordance with the third fluctuation amount determination information is a third operating state;
   mixing ratio setting means for setting a ratio of mixing the waste oil and the petroleum-based fuel oil in accordance with the first, second and third operating states on the basis of individual pieces of fluctuation amount determination information fed from the engine speed fluctuation determination means; and
   first control means for regulating the amount of the waste oil supplied from the first fuel tank to the fuel mixing means and the amount of the petroleum-based fuel oil supplied from the second fuel tank to the fuel mixing means by controlling the waste oil quantity regulating means and the petroleum-based fuel oil quantity regulating means on the basis of the mixing ratio set by the mixing ratio setting means.

2. The diesel engine fuel supply control device according to claim 1, wherein the fuel supply means includes fuel switching means for supplying one of the waste oil and the petroleum-based fuel oil by switching to one of the fuel mixing means and the second fuel tank, the diesel engine fuel supply control device further comprising:
   second control means which controllably varies the mixing ratio set by the mixing ratio setting means in a stepwise fashion so that the ratio of mixing the waste oil is increased by outputting a control command to the mixing ratio setting means when the operating state determination means determines that the diesel engine is in the first operating state and then causes the first control means to control the waste oil quantity regulating means and the petroleum-based fuel oil quantity regulating means in accordance with the stepwise mixing ratio, controls the waste oil quantity regulating means and the petroleum-based fuel oil quantity regulating means so that the current mixing ratio set by the mixing ratio setting means is maintained by outputting a control command to the first control means when the operating state determination means determines that the diesel engine is in the second operating state, and supplies the petroleum-based fuel oil alone from the second fuel tank for a specified period of time to run the diesel engine with the petroleum-based fuel oil by outputting a switching control command to the fuel switching means to thereby purge a fuel supply system including a fuel pump and an injection nozzle constituting the fuel supply system with the petroleum-based fuel oil when the operating state determination means determines that the diesel engine is in the third operating state.

3. The diesel engine fuel supply control device according to claim 2, wherein the operating state determination means determines that a state in which the diesel engine is run is a fourth operating state when the operating state determination means determines that the amount of engine speed fluctuation has a value exceeding the second set value, and the second control means has a control function to supply the petroleum-based fuel oil alone from the second fuel tank for a specified period of time to run the diesel engine with the petroleum-based fuel oil by outputting the switching control command to the fuel switching means to thereby purge the fuel supply system with the petroleum-based fuel oil on the basis of the fluctuation amount determination information.

4. The diesel engine fuel supply control device according to claim 3, wherein the second control means has a control function to vary the mixing ratio set by the mixing ratio setting means in a stepwise fashion so that the ratio of mixing the waste oil is decreased by outputting a mixing ratio altering command to the mixing ratio setting means each time the fuel supply system is purged with the petroleum-based fuel oil until the speed of the diesel engine reaches the target engine speed in a stable fashion.

5. The diesel engine fuel supply control device according to claim 3, wherein the first fuel tank is further provided with a filter for removing impurities contained in the waste oil supplied from the first fuel tank to the fuel mixing means.

6. The diesel engine fuel supply control device according to claim 2, wherein the first fuel tank is further provided with a filter for removing impurities contained in the waste oil supplied from the first fuel tank to the fuel mixing means.

7. The diesel engine fuel supply control device according to claim 2, wherein the second control means has a control function to vary the mixing ratio set by the mixing ratio setting means in a stepwise fashion so that the ratio of mixing the waste oil is decreased by outputting a mixing ratio altering command to the mixing ratio setting means each time the fuel supply system is purged with the petroleum-based fuel oil until the speed of the diesel engine reaches the target engine speed in a stable fashion.

8. The diesel engine fuel supply control device according to claim 7, wherein the first fuel tank is further provided with a filter for removing impurities contained in the waste oil supplied from the first fuel tank to the fuel mixing means.

9. The diesel engine fuel supply control device according to claim 1, wherein the fuel supply means includes fuel switching means for supplying one of the waste oil and the petroleum-based fuel oil by switching to one of the fuel mixing means and the second fuel tank, the diesel engine fuel supply control device further comprising:
   a timer for managing operating time of the diesel engine and purging time required for purging a fuel supply system including a fuel pump and an injection nozzle constituting the fuel supply means with the petroleum-based fuel oil for a specified period of time at intervals of unit time; and
   third control means which supplies the petroleum-based fuel oil from the second fuel tank for a specified period of time to run the diesel engine with the petroleum-based fuel oil by outputting a switching control command from the timer to the fuel switching means each time a point in time set in the timer at intervals of the unit time is reached to thereby purge the fuel supply system including the fuel pump and the injection nozzle constituting the fuel supply system with the petroleum-based fuel oil.

10. The diesel engine fuel supply control device according to claim 9, wherein the first fuel tank is further provided with a filter for removing impurities contained in the waste oil supplied from the first fuel tank to the fuel mixing means.

11. The diesel engine fuel supply control device according to claim 1, wherein the first fuel tank is further provided with a filter for removing impurities contained in the waste oil supplied from the first fuel tank to the fuel mixing means.

* * * * *